United States Patent
Di Balsamo et al.

(10) Patent No.: US 10,114,722 B2
(45) Date of Patent: Oct. 30, 2018

(54) TEST OF THE EXECUTION OF WORKLOADS IN A COMPUTING SYSTEM

(71) Applicant: INTERNATIONAL BUSINESS MACHINES CORPORATION, Armonk, NY (US)

(72) Inventors: Arcangelo Di Balsamo, Rome (IT); Ziantoni Francesca, Vicovaro (IT); Ilaria Gorga, Rome (IT); Sandro Piccinini, Rome (IT)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 61 days.

(21) Appl. No.: 14/833,330

(22) Filed: Aug. 24, 2015

(65) Prior Publication Data

US 2017/0060722 A1    Mar. 2, 2017

(51) Int. Cl.
*G06F 9/46* (2006.01)
*G06F 11/34* (2006.01)

(52) U.S. Cl.
CPC ...... *G06F 11/3433* (2013.01); *G06F 11/3495* (2013.01); *G06F 11/3414* (2013.01)

(58) Field of Classification Search
CPC ........................................................ G06F 9/52
See application file for complete search history.

(56) References Cited

U.S. PATENT DOCUMENTS

| | | | |
|---|---|---|---|
| 7,203,705 B2 * | 4/2007 | Todd | G06F 9/546 |
| 7,707,594 B1 * | 4/2010 | Foster | G06F 9/5055 709/201 |
| 8,001,422 B1 | 8/2011 | Sun et al. | |
| 8,839,035 B1 | 9/2014 | Dimitrovich et al. | |
| 8,977,903 B1 | 3/2015 | Chandrasekharapuram et al. | |
| 2004/0034857 A1 * | 2/2004 | Mangino | G06Q 10/06 718/104 |
| 2005/0114829 A1 * | 5/2005 | Robin | G06Q 10/06 717/101 |
| 2011/0231822 A1 | 9/2011 | Sabin et al. | |
| 2013/0117759 A1 * | 5/2013 | Gounares | G06F 9/5083 718/104 |
| 2014/0237550 A1 | 8/2014 | Anderson et al. | |
| 2014/0278623 A1 | 9/2014 | Martinez et al. | |
| 2016/0034318 A1 * | 2/2016 | Byreddy | G06F 9/4881 718/105 |
| 2016/0350205 A1 * | 12/2016 | Safari | G06F 11/3688 |

* cited by examiner

*Primary Examiner* — Emerson Puente
*Assistant Examiner* — Steven Do
(74) *Attorney, Agent, or Firm* — Richard A. Wilhelm, Esq; Kevin P. Radigan, Esq.; Heslin Rothenberg Farley & Mesiti, P.C.

(57) ABSTRACT

Testing execution of workloads in a computing system is provided. The testing includes: providing a definition of one or more workloads for each one of a plurality of users of the computing system, mapping each production computing machine of each test workload on a staging computing machine of a staging environment common to the users, mirroring the production computing machine, executing each work unit of each test workload on the corresponding staging computing machine, and determining a test result of an execution of each test workload according to an execution result of one or more executions of the work units of the test workload.

20 Claims, 5 Drawing Sheets

TEST OF THE EXECUTION OF WORKLOADS IN A COMPUTING SYSTEM

BACKGROUND

The background of the present disclosure is hereinafter introduced with the discussion of techniques relating to its context. However, even when this discussion refers to documents, acts, artifacts and the like, it does not suggest or represent that the discussed techniques are part of the prior art or are common general knowledge in the field relevant to the present disclosure.

The present disclosure relates to the information technology field. More specifically, this disclosure relates to the test of the execution of workloads.

The execution of workloads (for example, batch jobs) is a common activity in computing systems. A typical example is when workload schedulers, or simply schedulers, control the execution of the workloads by arranging them into plans defining the flow of execution of the workloads according to corresponding desired execution times and dependencies.

The schedulers may be supplied as cloud services in cloud (computing) environments according to a Software-as-a-Service (SaaS) model. In this case, the schedulers are made available to users thereof by cloud providers, which provision, configure and release corresponding computing resources upon request (so that their actual implementation is completely opaque thereto). This de-coupling of the cloud services from the actual computing resources that implement them provides the illusion of an infinite capacity thereof and improves their exploitation, especially for high-peak load conditions (by means of economies of scale); moreover, the users are now relieved of the management of these computing resources (for example, their installation and maintenance), and they may perform tasks (on a pay-per-use basis) that were not feasible previously because of their cost and complexity (especially for individuals and small companies). The above convert corresponding CAPital EXpenditure (CAPEX) into OPerating EXpenditure (OPEX), thereby resulting in increased control and flexibility.

In particular, the schedulers may be designed as multi-tenant software programs capable of serving multiple users at the same time (referred to as tenants) by each instance thereof. For this purpose, the multi-tenant schedulers partition the data of their tenants logically, so that each tenant is provided with a virtual scheduler emulating a dedicated instance thereof. This provides significant cost savings and management simplifications.

Generally, the execution of the workloads should be tested (to verify whether they behave correctly, for example, from the point of view of their functionalities and performance) before deploying the workloads for execution into production environments.

For this purpose, the workloads might be tested directly in the production environments. However, this would involve an overload of the production environments that may adversely affect their overall performance and reliability; moreover, when the schedulers supplied as cloud services are charged on a pay-per-use basis, the test of the workloads in the production environments would cause a significant increase of their operating costs.

Alternatively, it might be possible to replicate the production environments into corresponding test environments that are completely separate therefrom, so that the workloads are tested therein independently of the production environments. However, the replication of the production environments in the corresponding test environments involves a significant waste of computing resources.

BRIEF SUMMARY

Provided herein, in one or more aspects, is a method for testing execution of workloads in a computing system. The method includes: providing a definition of one or more workloads for each one of a plurality of users of the computing system, the definition of each workload comprising an indication of one or more work units to be executed, an indication of a production computing machine of a production computing environment of the corresponding user for executing each work unit and an indication of an execution mode of the workload setting the workload as a production workload to be executed in a production mode or as a test workload to be executed in a test mode; mapping each production computing machine of each test workload on a staging computing machine, of one or more shared staging computing machines of a staging computing environment common to the users, mirroring the production computing machine; executing each work unit of each test workload on the corresponding staging computing machine; and determining a test result of an execution of each test workload according an execution result of one or more executions of the work units of the test workload.

In another aspect, a computer program product is provided for testing execution of workloads in a computing system. The computer program product includes a computer readable storage medium having computer readable program instructions embodied therein, the computer readable program instructions being executable by the computing system to cause the computing system to: provide a definition of one or more workloads for each one of a plurality of users of the computing system, the definition for each workload comprising and indication of one or more work units to be executed, an indication of a production computing machine of the computing system in a production computing environment of the corresponding user for executing each work unit and an indication of an execution mode of the workload setting the workload as a production workload to be executed in a production mode or as a test workload to be executed in a test mode; map each production computing machine of each test workload on a staging computing machine, of one or more shared staging computing machines of the computing system in a staging computing environment common to the users, mirroring the production computing machine, execute each work unit of each test workload on the corresponding staging computing machine, and determine a test result of an execution of each test workload according to an execution result of one or more executions of the work units of the test workload.

In a further aspect, a system is provided which includes: a workload manager for providing a definition of one or more workloads for each one of a plurality of users of a computing system, the definition of each workload comprising an indication of one or more work units to be executed, an indication of a production computing machine of the computing system in a production computing environment of the corresponding user for executing each work unit and an indication of an execution mode of the workload setting the workload as a production workload to be executed in a production mode or as a test workload to be executed in a test mode; a transposing module for mapping each production computing machine of each test workload on a staging computing machine, of one or more shared staging computing machines of the computing system in a staging computing environment common to the users, mirroring the production computing machine; a queue manager for executing each work unit of each test workload on the corresponding staging computing machine; and the transposing module further adapted to determine a test result of an execution of each test workload according to an execution result of one or more executions of the work units of the test workloads.

BRIEF DESCRIPTION OF THE DRAWINGS

The solution of the present disclosure, as well as further features and the advantages thereof, will be best understood with reference to the following detailed description thereof, given purely by way of a non-restrictive indication, to be read in conjunction with the accompanying drawings (wherein, for the sake of simplicity, corresponding elements are denoted with equal or similar references and their explanation is not repeated, and the name of each entity is generally used to denote both its type and its attributes—such as value, content and representation). By way of example.

DETAILED DESCRIPTION

A simplified summary of the present disclosure is herein presented in order to provide a basic understanding thereof; however, the sole purpose of this summary is to introduce some concepts of the disclosure in a simplified form as a prelude to its following more detailed description, and it is not to be interpreted as an identification of its key elements nor as a delineation of its scope.

In general terms, the present disclosure is based on the idea of providing a common test environment.

For instance, one or more aspects of the present invention provide a method for testing execution of workloads in a computing system. The method comprises providing a definition of one or more workloads for each one of a plurality of users of the computing system (the definition of each workload comprising an indication of one or more work units to be executed, an indication of a production computing machine of a production computing environment of the corresponding user for executing each work unit and an indication of an execution mode of the workload setting the workload as a production workload to be executed in a production mode or as a test workload to be executed in a test mode), mapping each production computing machine of each test workload on a staging computing machine (of one or more shared staging computing machines of a staging computing environment common to all the users) mirroring the production computing machine, executing each work unit of each test workload on the corresponding staging computing machine, and determining a test result of an execution of each test workload according to an execution result of one or more executions of the work units of the test workload.

One or more further aspects provide a software program and a software program product for implementing the method.

In addition, one or more aspects provide a corresponding system or systems.

More specifically, one or more aspects of the present disclosure are set out in the independent claims and advantageous features thereof are set out in the dependent claims, with the wording of all the claims that is herein incorporated verbatim by reference (with any advantageous feature provided with reference to any specific aspect that applies mutatis mutandis to every other aspect).

Figure 1:
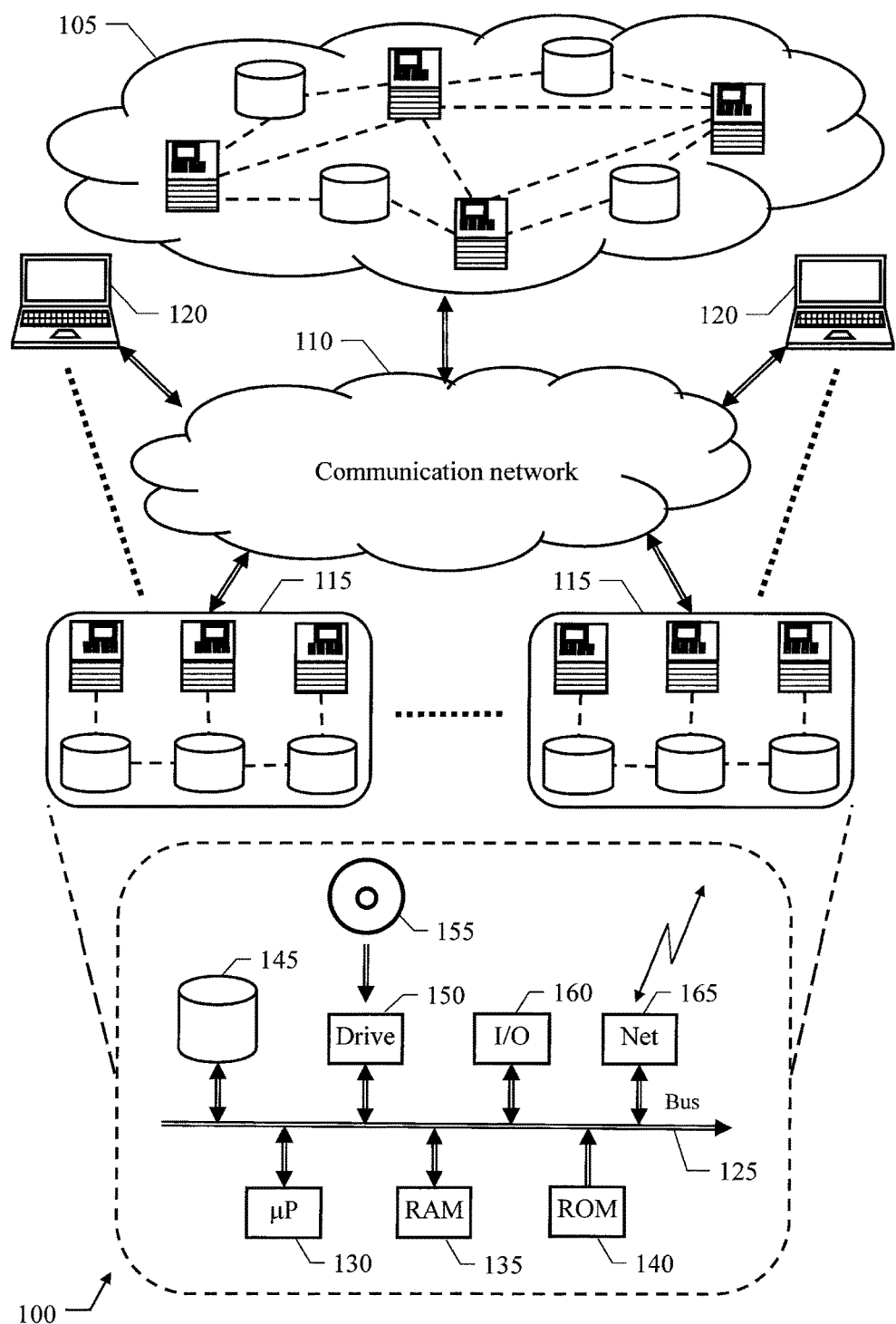
FIG. 1 shows a schematic block-diagram of a computing infrastructure, wherein a solution according to one or more aspects of the present invention may be applied.

With reference in particular to FIG. 1, a schematic block-diagram is shown of a computing infrastructure 100 wherein a solution according to an embodiment of the present disclosure may be applied.

Particularly, the computing infrastructure 100 may be a cloud (computing) infrastructure (supplying cloud services on demand), which may be based on different deployment models, such as public cloud (i.e., for the general public), private cloud (i.e., for a single organization), community cloud (i.e., for several organizations) or hybrid cloud (i.e., based on a combination of different deployment models).

The cloud or computing infrastructure 100 comprises one or more cloud providers 105 (only one shown in the figure). Each cloud provider 105 is an entity (generally implemented by one or more data centers, not shown in the figure), which supplies a pool of (hardware and/or software) computing resources as cloud services (i.e., shared computing resources that may be provisioned, configured and released very rapidly); the computing resources of the cloud services (generally of the virtual type, i.e., emulations by software of physical resources) are supplied upon request to users of the cloud provider 105, so that each user has the sole control of these computing resources (which may then be used exactly as if they were dedicated thereto).

The users connect to the cloud provider 105 through a communication network 110. For this purpose, the cloud provider 105 exposes a front-end component for accessing it. Moreover, the cloud provider 105 has a back-end component that actually implements the cloud services; the back-end component of the cloud provider 105 is not accessible from the outside, so that the users are completely unaware of its location and configuration.

The cloud services may be supplied according to several service models; for instance, the cloud services may comprise software applications supplied according to the SaaS model (for example, with the cloud infrastructure 100 that is public and with the cloud provider 105 that is a third party accessed through the Internet). For example, these software applications may comprise a (workload) scheduler, such as the commercial product "IBM Tivoli Workload Scheduler" (ITWS) by IBM Corporation (trademarks); typically, the scheduler may be multi-tenant so as to serve multiple users, or tenants, by each instance thereof. The scheduler may be used by each tenant to control the execution of corresponding workloads in the cloud infrastructure 100, for example, in a data center 115 (or more) of the tenant. The tenant accesses the scheduler (for example, for configuring, monitoring and reporting purposes) with one or more client computing machines thereof, or simply clients, 120 (for example, of the laptop-type).

Each computing machine of the cloud infrastructure 100 (i.e., server computing machine, or simply server, of the data centers 105,115 and client 120) may comprise several units that are connected in parallel to a bus structure 125 (with its architecture that is suitably scaled according to the actual function of the computing machine in the cloud infrastructure 100). By way of example, one or more microprocessors (μP) 130 control operation of the computing machine; a RAM 135 may be directly used as a working memory by microprocessors 130, and a ROM 140 may store basic code for a bootstrap of the computing machine. The computing machine may also have a mass memory comprising one or more hard-disks 145 (for example, provided by external storage units of their data centers 105,115 for the servers), drives 150 for reading/writing removable storage units 155 (for example, optical disks) and input/output (I/O) units 160 such as a keyboard, a mouse, and a monitor (for example, provided by a console of their data centers 105,115 for the servers). The computing machine is equipped with a network adapter 165, which is used to access the communication network 110 (and to plug the servers into their data centers 105,115).

Figure 2:
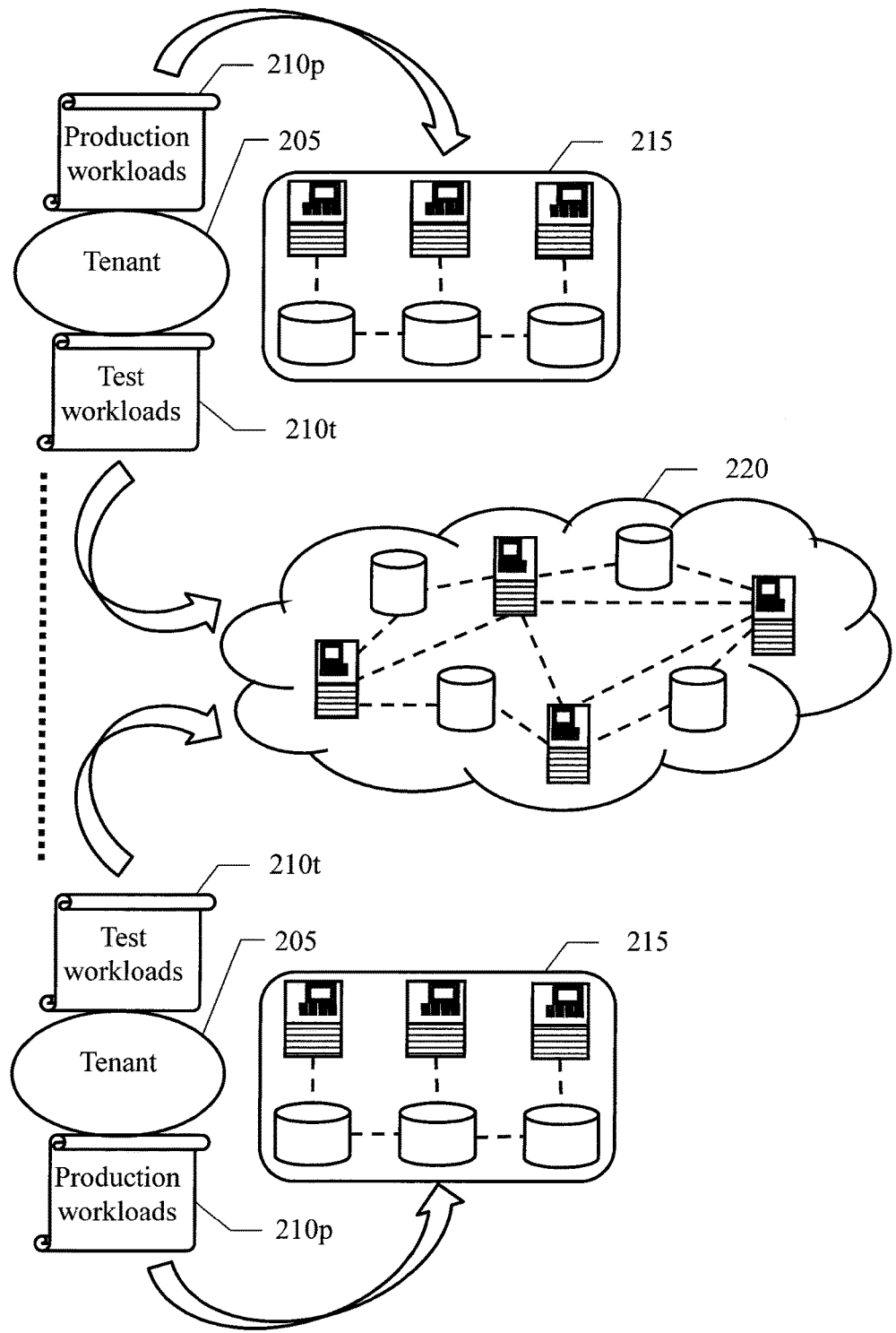
FIG. 2 shows an exemplary application of a solution according to one or more aspects of the present invention.

Referring to FIG. 2, an exemplary application is shown of a solution according to one or more aspects of the present invention.

Each tenant of the scheduler, denoted with the reference 205, defines one or more workloads 210p,210t, wherein the definition of each workload 210p,210t comprises an indication of one or more work units to be executed (for example, jobs of a job stream) and an indication of a production (computing) machine of a production computing environment 215 of the tenant 205, wherein each work unit should be executed to provide the object for which it has been designed (for example, a server of its data center). Moreover, the definition of the workload 210p,210t may comprise an indication of its execution mode; for instance, the workload may be a production workload 210p to be executed in a production mode (i.e., to actually achieve its object) or a test workload 210t to be executed in a test mode (i.e., simply to verify whether it behaves correctly).

Each production workload 210p is submitted for execution in the corresponding production computing environment 215 as usual. For each test workload 210t, each production machine thereof is mapped on a staging (computing) machine. The staging machine is selected among one or more staging machines that may be shared among all the tenants in a staging computing environment 220 (common to all the tenants); each staging machine mirrors the corresponding production machine (i.e., the staging machine behaves like the production machine as far as possible so as to simulate it). Each work unit of the test workload is then executed on the corresponding staging machine of the staging computing environment 220. A (test) result of the execution of the test workload is then determined according to an (execution) result of one or more executions of its work units (for example, to promote the test workload to the production mode when it was successful for a predetermined number of consecutive times according to a performance pattern of its work units, as described in the following).

In this way, the workloads may be tested without involving any overload of the production computing environments, so that their overall performance and reliability is unaffected; moreover, when the scheduler (supplied as a cloud service) is charged on a pay-per-use basis, the test of the workloads does not cause any increase of its operating cost.

At the same time, the use of the staging environment that is common to all the tenants, with its staging machines that are shared among all the tenants, limits the waste of computing resources (for example, staging machines) required for testing the workloads.

In other words, the above-described technique implements the test of the workloads too as a service; this provides a solution that is very dynamic, resilient and flexible.

Figure 3:
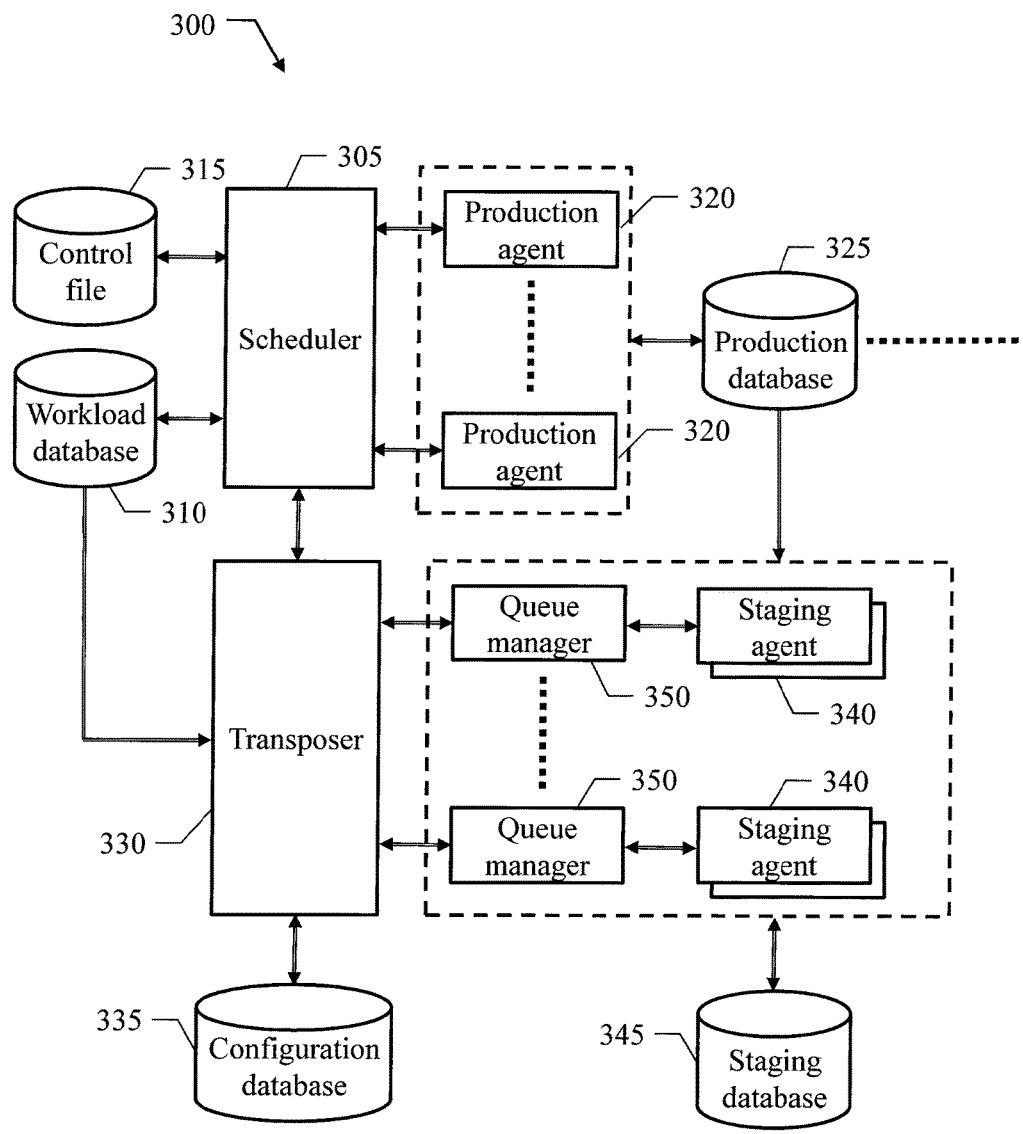
FIG. 3 depicts one embodiment of certain software components that may be used to implement a solution according to one or more aspects of the present invention.

Referring to FIG. 3, the main software components are shown that may be used to implement a solution according to one or more aspects of the present invention.

The software components (programs and data), which are denoted as a whole with the reference 300, are typically stored in the mass memory and loaded (at least partially) into the working memory of the corresponding computing machines when the programs are running. The programs are initially installed into the mass memory, for example, from removable storage units or from the communication network. In this respect, each software component may represent a module, segment or portion of code, which comprises one or more executable instructions for implementing the specified logical function.

In detail, one or more instances of a scheduler 305 run on corresponding (control) servers of the cloud provider. The scheduler 305 serves one or more tenants, each one having sole control of corresponding data, among the one of all the tenants of the scheduler 305 (for example, by means of unique filters assigned thereto).

The scheduler 305 exposes an interface that allows each tenant to define its workloads, to submit them for execution, to monitor their executions and to report results thereof.

For instance, the tenant may control a workload database 310 (for example, by means of a configurator like the Composer module in the ITWS). The workload database 310 contains a definition of all the production machines that are available to the scheduler 305 for the tenant; the production machines may be either (execution) servers of the data center of the tenant or (execution) servers of the cloud provider dedicated thereto. Each production machine is defined by an identifier for accessing it (such as its host name and IP address), together with corresponding physical/logical characteristics represented by corresponding computing resources (for example, processing power, memory size, operating system). The workload database 310 further comprises a workload descriptor of each workload of the tenant (i.e., an activity providing an actual production work). The workload descriptor specifies one or more work units (i.e., tasks that may be submitted for execution to single computing machines) forming the workload; for example, the workload may be a single job or a job stream comprising an ordered sequence of logically related jobs to be executed sequentially, possibly depending on the results of previous jobs. The workload descriptor specifies one or more operations to be performed for executing each work unit (for example, the invocation of a software program, typically of the batch type, with its arguments and environmental variables). Moreover, the workload descriptor defines an execution policy of the workload. Particularly, the execution policy indicates the production machine on which each work unit of the workload may be executed, either statically (by its identifier) or dynamically (by its characteristics); the execution policy then indicates when the workload should be executed (for example, its date and time with a possible run-cycle) and any constraints for its execution, for example, earliest/latest time for execution, maximum allowable duration, pre-condition items required on the production machine, such as specific files, and dependencies on the completion of other workloads. The workload database 310 also stores statistic information relating to previous executions of the workloads (such as their results and durations).

In a solution according to one or more embodiments disclosed herein, each workload descriptor further specifies the mode of execution of the corresponding workload, for example, by means of a dedicated test attribute. For instance, the test attribute indicates whether the workload is a production workload (to be executed in the production mode) or a test workload (to be executed in the test mode). In the latter case, the test attribute may also define the test mode as qualitative (or functional) to verify whether the test workload actually performs its functions (for example, it simply completes correctly) or as quantitative (or performance) to verify whether the test workload provides acceptable performance. The acceptable performance of the test workload is defined (in the test attribute) by a performance pattern to be met by the execution of the test workload; the performance pattern may be either global for the whole test workload or individual for each work unit thereof (for example, a desired timeframe for completion of the test workload or of each work unit). Moreover, the test attribute may comprise a test condition (or more) that makes the test result successful or failed when it is fulfilled or not, respectively. For example, the test condition may require (in addition to the correct execution of the test workload, possibly according to its performance pattern) the existence of one or more post-condition items on the corresponding staging machine (such as new files created during the execution of the test workload); moreover, the test condition may require its fulfillment either for a single execution of the test workload or for a predefined number of consecutive executions thereof. The test attribute may also indicate a test action to be performed when the test result is successful (according to the test condition); for example, the test action may be an automatic promotion or a suggested promotion (to be confirmed manually) of the test workload to the production mode.

The tenant may further request the creation of a plan (or more) for execution of its workloads in a production period (typically, one day). For this purpose, the scheduler 305 manages (for example, by means of a planner like the Master Domain Manager module in the ITWS) a control file 315 that stores the plan (like the Symphony file in the ITWS). The plan specifies the flow of execution of the workloads in the production period, together with the definition of the corresponding production machines; the workloads are arranged in the plan in a sequence meeting their execution times and constraints. In the solution according to an embodiment of the present disclosure, the plan only comprises the production workloads (whereas the test workloads are completely ignored during its creation).

The tenant may then request the execution of a selected plan or the execution of one or more selected workloads (for example, by means of a handler like the Batchman module in the ITWS that controls the starting of the plan and the submission of the work units of any workloads for execution and by means of an executor like the Workloadman module in the ITWS that controls their actual execution). For this purpose, the scheduler 305 (and particularly its executor) interfaces with a production (execution) agent 320 running on each production machine. Each production agent 320 controls the execution on the corresponding production machine of each work unit submitted thereto; for this purpose, the production agent 320 may read/write (private) data of the tenant, which is stored in a production database 325 (or more). The production machines with their production agents 320 and the production database 325 then define the production environment of the tenant.

In a solution according to one or more aspects of the present invention, the scheduler 305 further interfaces with a (common) transposing module, or simply transposer, 330 for executing the work units of the test workloads of all the tenants. The transposer 330 controls the staging machines that are available for executing the test workloads of all the tenants; the staging machines are further (execution) servers of the cloud provider dedicated thereto. For this purpose, the transposer 330 accesses the workload database 310 of each tenant and it controls a configuration database 335; the configuration database 335 contains a definition of each staging machine (as above, its identifier together with corresponding physical/logical characteristics), an alias for each production machine mapped thereon and an indication of its shared computing resources (which are normally shared among all the work units in execution thereon, for example, processing power, working memory) that may have been reserved for executing specific work units. Each staging machine runs one or more instances of a staging (execution) agent 340, which control the execution of corresponding work units submitted thereto. For this purpose, each staging agent 340 accesses (in read mode only) the production database 325 and it controls (in read/write mode) a staging database 345 (or more) for each tenant (storing any data thereof that has been updated). The staging machines with their staging agents 340 and the (production and staging) databases 325,345 then define the (common) staging environment of all the tenants. In this way, the stating environment is integrated with the production environments of the tenants, so that the production environments may be exploited as far as possible for executing the test workloads (but without affecting them); this limits the consumption of computing resources required for the test and improves its quality.

The transposer 330 interfaces with the staging agents 340 of each staging machine through a queue manager 350 common to all of them. The queue manager 350 controls the dispatching of the work units of all the tenants (submitted thereto for execution by the transposer 330) to the staging agents 345; in this way, the queue manager 350 implements a polymorphism mechanism on its staging machine, which may behave like different production machines over time (sequentially and/or concurrently). Moreover, the queue managers 350 of all the staging machines cooperate among them for reserving the shared computing resources that may be required for executing the work units and for controlling any dependencies thereof; in this way, the control of the execution of the test workloads is orchestrated by the queue managers, so as to avoid overloading the scheduler 305 (and then adversely affecting the execution of the production workloads).

Figure 4A:
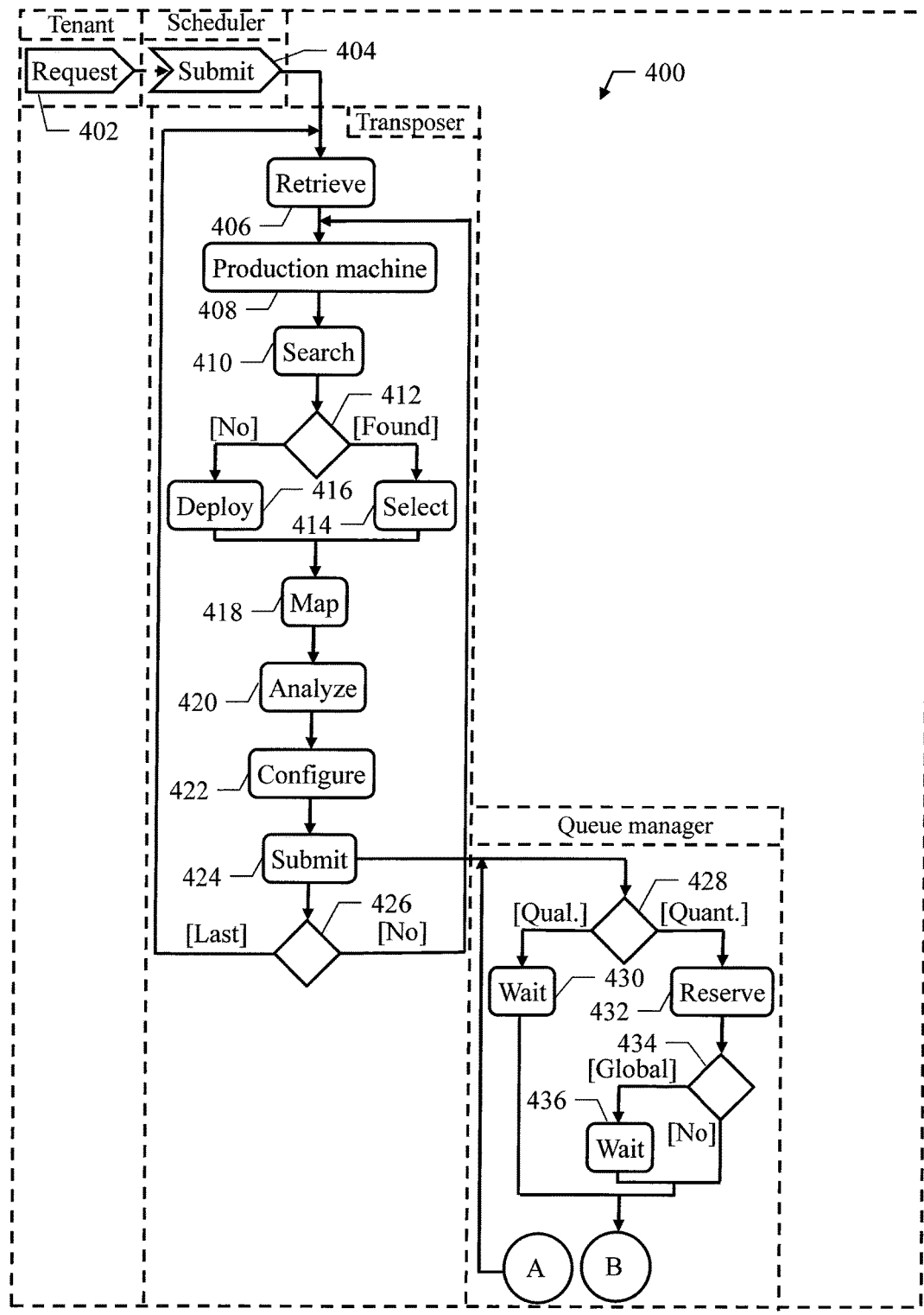
FIGS. 4A-4B show an activity diagram describing an exemplary flow of activities relating to an implementation of a solution according to one or more aspects of the present invention.
Figure 4B:
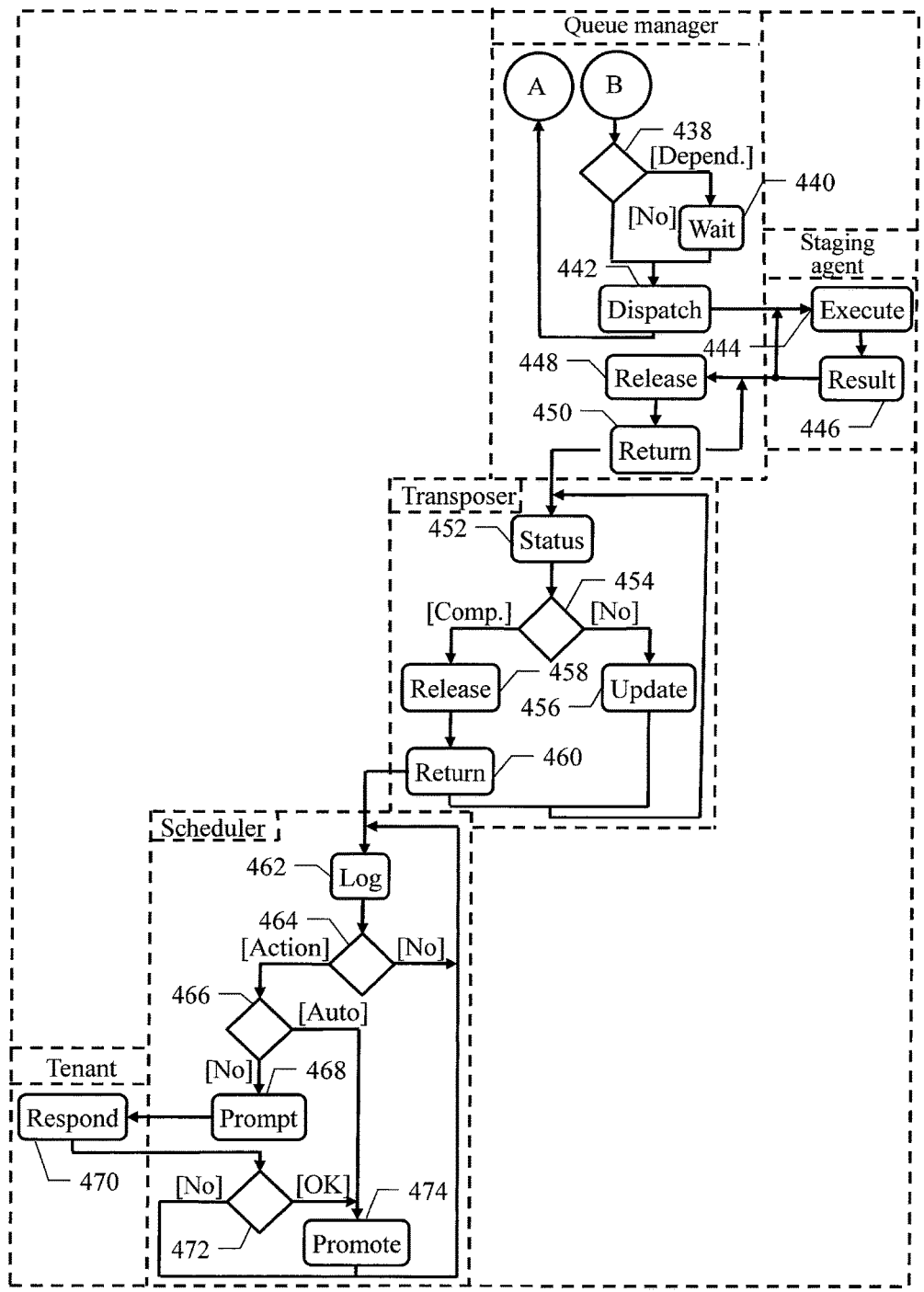

With reference now to FIGS. 4A-4B, an activity diagram is shown describing a flow of activities relating to an implementation of a solution according to one or more aspects of the present invention.

Referring to FIGS. 4A and 4B, the diagram represents an exemplary process for testing the execution of a generic test workload in the above-described cloud infrastructure with a method 400. In this respect, each block may represent one or more executable instructions for implementing the specified logical function on the relevant computing machine.

The process begins at block 402 in the process-lane of the corresponding tenant (for example, in the person of a system administrator thereof) as soon as it submits a request for executing the test workload to the scheduler. In response thereto, the scheduler at block 404 in its process-lane directly submits the test workload for execution to the transposer.

Moving now to the process-lane of the transposer, it is listening for the submission of any test workload at block

406. As soon as the transposer receives the submission of a new test workload, it retrieves the corresponding workload descriptor from the workload database of the tenant. The transposer then performs a loop for processing each work unit thereof (as indicated in the workload descriptor). The loop begins at block 408, wherein the transposer retrieves the characteristics of the production machine required for the execution of a (current) work unit (starting from a first one along the test workload); the characteristics of the production machine are extracted from the workload descriptor when the production machine is defined dynamically in it (by its characteristics) or they are extracted from the definition of the production machine in the workload database of the tenant when the production machine is defined statically in the workload descriptor (by its identifier). The transposer at block 410 searches any eligible staging machine, among all the staging machines that are available in the staging computing environment (as indicated in the configuration database), that is adapted to mirror the production machine; each eligible staging machine has its available computing resources (i.e., not reserved for the execution of other work units) at least equal to the corresponding characteristics of the production machine that are measurable (i.e., that may be assigned numeric values) or the same as corresponding characteristics of the production machine that are unmeasurable (for example, equal or higher processing power, equal or larger working memory, same operating system). The flow of activity branches at block 412 according to a result of this search. When one or more eligible staging machines have been found, one of them is selected at block 414 (for example, by load balancing techniques). Conversely (when none of the staging machines is adapted to mirror the production machine), the transposer at block 416 deploys a new staging machine in the staging computing environment. The new staging machine is configured according to the characteristics of the production machine. For example, the computing resources of the new staging machine are set the same as the corresponding unmeasurable characteristics of the production machine; moreover, the computing resources of the new staging machine are set equal to a predefined multiple ($\geq 1$, such as 1, 2, 5, etc.) of the corresponding measurable characteristics of the production machine, but in any case equal to a predefined minimum value (balancing the opposed requirements of limiting the waste of computing resources and the operations for deploying/releasing the staging machines). Moreover, the new staging machine comprises an instance of the queue manager and one or more instances of the staging agent (according to the work units that may be executed concurrently on it). In both cases, the process merges at block 418 from either the block 414 or the block 416. At this point, the transposer maps the production machine on the eligible staging machine selected at block 414 or on the new staging machine deployed at block 416. For this purpose, the transposer adds an alias to this staging machine equal to the identifier of the production machine; in this way, the work units may access the staging machines as they access the corresponding production machines in a seamless way (without requiring any change thereto).

Continuing to block 420, the transposer analyzes the work unit to determine its pre-requisites, i.e., computing resources that are required for its execution. For instance, the transposer extracts an indication of the software program to be invoked and of any pre-condition items to be available on the production machine from the workload descriptor; moreover, the transposer introspects the work unit to determine any remote services that may be invoked by it. The transposer at block 422 then configures the staging machine according to the pre-requisites of the work unit, so as to mimic the production computing environment of the tenant. For example, the transposer installs the software program to be invoked and creates any pre-condition item (such as by copying required files from the corresponding production machine). Moreover, the transposer adds the declaration of a stub service to the queue manager for each remote service, which stub service exposes the same interface as the remote service does so as to simulate its behavior. Continuing to block 424, the transposer submits the work unit for execution to the queue manager of the staging machine. A test is made at block 426, wherein the transposer verifies whether a last work unit of the test workload has been processed. If not, the process returns to the block 408 to repeat the same operations for a next work unit of the test workload. Conversely (once all the work units of the test workload have been processed), the above-described loop is exited and the process returns to the block 406 waiting for the submission of any further test workload.

Referring to the process-lane of the queue manager of a generic staging machine, it is listening for the submission of any work unit at block 428. As soon as the queue manager receives the submission of a new work unit, the flow of activity branches according to the execution mode of its test workload (as indicated in the workload descriptor). For instance, when the test is qualitative the block 430 is executed, whereas when the test is quantitative the blocks 432-436 are executed; in both cases, the flow of activity merges again at block 438. With reference in particular to the block 430 (qualitative test), the queue manager adds the work unit to a FIFO queue for its execution; the process then descends into block 438 as soon as the work unit (after crossing the whole FIFO queue) may be executed on the staging machine since a staging agent has become available. With reference instead to the block 432 (quantitative test), the queue manager reserves a staging agent as soon as it becomes available. Moreover, as soon as possible the queue manager reserves the shared computing resources of the staging machine according to the corresponding characteristics of its production machine (as indicated in the workload descriptor or in the workload database as above), for example, the same processing power and working memory; these reserved (shared) computing resources allow simulating the same performance of the production machine on the staging machine (so as to provide reliable results even when other work units are in execution thereon at the same time). The flow of activity then branches at block 434 according to the performance pattern of the test workload (as indicated in the workload descriptor). For instance, if the performance pattern is global for the whole test workload (comprising multiple work units), the queue manager enters a waiting condition at block 436 for the reservation of the shared computing resources corresponding to the characteristics of its production machine on the staging machine of each other work unit of the test workload (for example, by polling their queue managers). The process then descends into block 438 as soon as the shared computing resources for all the other work units of the test workload have been reserved on the corresponding staging machines. In this way, the queue managers (of the different staging machines) orchestrate (in a completely distributed way) the creation of a fully reserved environment for the execution of the test workload in the quantitative mode (so as to provide reliable results even in the staging environment wherein multiple test workloads may be in execution at the same time). The same point is instead reached directly from the block 434 when the performance pattern is individual for each work unit of the test workload (or the test workload comprises a single work unit).

With reference to block 438, the flow of activity branches according to the dependencies of the work unit (as indicated in the workload descriptor). For instance, if the work unit depends on one or more (predecessor) work units of its test workload, the queue manager enters a waiting condition at block 440 for completion of the execution of all the predecessor work units (for example, again by polling the corresponding queue managers). The process then descends into block 442 as soon as all the predecessor work units have been completed; the same point is instead reached directly from the block 438 when the work unit has no dependency in the test workload. In this case as well, the queue managers (of the different staging machines) orchestrate the execution of the work units respecting their dependencies in a completely distributed way. At this point, the queue manager dispatches the submission of the work unit for its actual execution to the corresponding staging agent; the process then returns to the block 428 waiting for the submission of any further work unit.

Referring to the process-lane of a generic staging agent, it is listening for the submission of any work unit at block 444. As soon as the staging agent receives the submission of a new work unit, the staging agent executes it as usual. However, in this case, the staging agent passes the invocation of any remote service to the queue manager, which replaces it with the invocation of the corresponding stub service; in this way, it is possible to mirror the invocation of any remote service, even when it is not accessible in the staging computing environment (for example, in case of commercial services subscribed by the corresponding tenant). Moreover, the staging agent writes any data of the corresponding tenant into its staging database and reads any data of the same tenant from this staging database when the data is available therein (since it has been updated by the staging agent beforehand) or from the corresponding production database otherwise; in this way, the stating agent may work on the actual data of the tenant in the production computing environment without affecting it (and without requiring any time consuming copy thereof). Once the execution of the work unit has been completed, the staging agent returns its execution result as usual (i.e., successful or failed) to the queue manager at block 446; the process then returns to the block 444 waiting for the submission of any further work unit.

Referring back to the process-lane of the queue manager, it is listening at block 448 for the execution result of any work unit that has been submitted by it (to the corresponding staging agent). As soon as the queue manager receives a new execution result, it releases the staging agent that has been used for executing the corresponding work unit; moreover, in case of qualitative test the queue manager also releases any shared computing resources of the staging machine that have been reserved for the same purpose. Continuing to block 450, the queue manager returns the execution result of the work unit to the transposer; for this purpose, in the qualitative test mode and in the quantitative test mode with the performance pattern being global for the whole test workload the queue manager simply forwards the execution result received from the corresponding staging agent, whereas in the quantitative test mode with the performance pattern being individual for each work unit the queue manager returns a successful result only when the work unit has been executed correctly and its execution performance meets the corresponding performance pattern (for example, it has been completed within the desired timeframe). The process then returns to the block 448 waiting for any further execution result.

Referring back to the process-lane of the transposer, it is listening at block 452 for the execution result of any work unit that has been submitted by it (to the corresponding queue manager). As soon as the transposer receives a new execution result, it updates the status of the corresponding work unit accordingly. Moreover, as soon as the execution of the whole test workload has been completed, the transposer updates a status thereof according to the corresponding test condition (as indicated in the workload descriptor). For example, in the qualitative test mode and in the quantitative test mode with the performance pattern being individual for each work unit the transposer may determine that this execution of the test workload is successful when all its work units have been executed correctly (possibly within the corresponding desired timeframes) and any post-condition items have been found (for example, the required files have been created), whereas in the quantitative test mode with the performance pattern being global for the whole test workload the transposer may determine that this execution of the test workload is successful when, in addition to the above-mentioned conditions, the whole test workload has been completed within the desired timeframe. A test is now made at block 454, wherein the transposer verifies whether the test of the test workload has been completed according to its test condition (with the determination of the corresponding test result); for example, this happens always when the test requires a single execution of the test workload or when the desired number of executions thereof has been reached (and in any case as soon as an execution of the test workload has failed). If not, the transposer at block 456 updates the status of the test workload accordingly (for example, by increasing the number of executions thereof that have been successful). Conversely, the transposer at block 458 removes all the resources that have been allocated for the execution of the test workload (i.e., the pre-requisites such as the invoked software programs and any pre-condition items from the corresponding staging machines, the stub services corresponding to any remote services, and possibly any staging machines that are not used any longer). Continuing to block 460, the transposer returns the test result of the test workload to the scheduler. The process then returns to the block 452 (either from the block 456 or from the block 460) waiting for any further test result.

Referring back to the process-line of the scheduler, it is listening at block 462 for the test result of any test workload that has been submitted by it (to the transposer). As soon as the scheduler receives a new test result, it logs it into the workload database of the tenant. Continuing to block 464, the scheduler verifies whether the test result involves the execution of any test action (as indicated in the workload descriptor). If so (for example, when the test attribute indicates the promotion of the test workload to the production mode if it has been successful), the flow of activity branches at block 466 according to this test action. For example, if the test action indicates the suggested promotion of the test workload (to be confirmed manually), the scheduler prompts the tenant to confirm this promotion at block 468. In response thereto, the tenant responds by accepting or refusing the promotion of the test workload at block 470 in its swim-lane. Returning to the swim-lane of the scheduler, the flow of activities branches at block 472 according to the response of the tenant. For instance, if the tenant has accepted the promotion of the test workload, its workload descriptor is updated accordingly at block 474 (by setting the test attribute to the production mode so as to convert it into a corresponding production workload); the same point is also reached directly from the block 466 when the test action of the test workload indicates its automatic promotion (so as to convert it without any intervention of the tenant). The process then returns to the block 462 waiting for the any further test result; the same point is also reached directly from the block 464 (when the test result does not involve the execution of any test action) or from the block 472 (when the tenant has not accepted the promotion of the test workload).

Naturally, in order to satisfy local and specific requirements, a person skilled in the art may apply many logical and/or physical modifications and alterations to the concepts disclosed herein. More specifically, although this disclosure has been presented with a certain degree of particularity with reference to one or more embodiments thereof, it should be understood that various omissions, substitutions and changes in the form and details as well as other embodiments are possible. For instance, different embodiments of the present disclosure may even be practiced without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the present disclosure may be incorporated in any other embodiment as a matter of general design choice. In any case, ordinal or other qualifiers are merely used as labels to distinguish elements with the same name but do not by themselves connote any priority, precedence or order. Moreover, the terms include, comprise, have, contain and involve (and any forms thereof) should be intended with an open, non-exhaustive meaning (i.e., not limited to the recited items), the terms based on, dependent on, according to, function of (and any forms thereof) should be intended as a non-exclusive relationship (i.e., with possible further variables involved), the term a/an should be intended as one or more items (unless expressly indicated otherwise), and the term means for (or any means-plus-function formulation) should be intended as any structure adapted or configured for carrying out the relevant function.

For example, one or more embodiments provide a method for testing execution of workloads in a computing system. The workloads may be in any number and of any type (for example, functions or tasks even of interactive type) and they may be executed in any computing system (see below).

In one or more embodiments, a definition of one or more workloads is provided for each one of a plurality of users of the computing system. However, the computing system may have any number and type of users (even not of multi-tenant type), and the definition of the workloads may be provided in any way (see below).

In one or more embodiments, the definition of each workload may comprise an indication of one or more work units to be executed. However, each workload may comprise any number and type of work units (for example, commands, job steps).

In one or more embodiments, the definition of each workload may comprise an indication of a production computing machine of a production environment of the corresponding user for executing each work unit. However, the production computing machines may be of any type (for example, mobile devices) and implemented in any way (for example, housed in data centers of third parties).

In one or more embodiments, the definition of each workload may comprise an indication of an execution mode of the workload, which sets the workload as a production workload (to be executed in a production mode) or as a test workload (to be executed in a test mode). However, the execution mode may be provided in any way (for example, with a flag that is added only for the test mode).

In one or more embodiments, each production computing machine of each test workload may be mapped on a staging computing machine (of one or more shared staging computing machines of a staging environment common to all the users) that mirrors the production computing machine. However, the staging computing machines may be in any number (either static or dynamic) and of any type (for example, implemented in a distinct data center); each production computing machine may be mapped on a staging computing machine that mirrors it in any way (see below).

In one or more embodiments, each work unit of each test workload may be executed on the corresponding staging computing machine. However, the work units may be executed in any way on the staging computing machines (see below).

In one or more embodiments, a test result of an execution of each test workload may be determined according to an execution result of one or more executions of the work units of the test workload. However, the test result of each test workload may depend on any number of executions of its work units, and it may be determined in any way (for example, according to a percentage of its successful executions); moreover, each execution result may be determined in any way (see below).

In one or more embodiments, each test workload may be submitted for execution to a transposing module common to all the users; the transposing module performs the step of mapping each production computing machine and it submits each work unit of the test workload for execution to the corresponding staging computing machine. However, the possibility of executing the test workloads under the control of the same workload scheduler of the production workloads (for example, by creating a dedicated plan) is not excluded.

In one or more embodiments, the executing each work unit may comprise submitting the work unit for execution to a queue manager of the corresponding staging computing machine common to all the users. However, the possibility of passing all the test workloads to an additional workload scheduler that controls their submission to the staging machines is not excluded.

In one or more embodiments, the submission of the work unit may be dispatched by the queue manager to an available staging agent (of one or more staging agents of the corresponding staging computing machine) for causing the staging agent to execute the work unit. However, the submission of the work unit may be dispatched in any way (for example, with different priorities) to any number of staging agents (for example, installed upon request on the staging computing machine up to a maximum allowable number); conversely, nothing prevents submitting the work units directly to the staging agents, even without any queue managers (for example, when a single staging agent is provided on each staging machine).

In one or more embodiments, the dispatching the submission of each work unit may comprise the following operation for each dependent work unit (of the work units of the corresponding test workload), which depends on one or more predecessor work units (of the work units of the corresponding test workload): the submission of the dependent work unit by the queue manager is dispatched in response to an indication of completion of the execution of all the predecessor work units from the queue managers of the corresponding staging computing machines. However, the queue managers may interact among them in any way (for example, by means of corresponding messages); in any case, the possibility of controlling the dependencies of the work units centrally (for example, by the transposer) is not excluded.

In one or more embodiments, the indication of the execution mode of each test workload may set the test workload as a qualitative test workload (to be executed in a qualitative test mode) or as a quantitative test workload (to be executed in a quantitative test mode). However, different, additional or alternative test modes may be provided (for example, of scalability, volume, stress type).

In one or more embodiments, the executing each work unit of each test workload may comprise (for each quantitative test workload) reserving one or more shared computing resources of the staging computing machine (mapping each production computing machine of the quantitative test workload) according to corresponding characteristics of the production computing machine. However, the computing resources (shared among any number of staging agents) may be in any number and of any type (for example, network bandwidth) and they may be reserved in any way (for example, with the same priority for all the work units irrespectively of the corresponding test mode); in any case, the possibility of executing the work units of each quantitative test workload individually on the corresponding staging computing machines (completely dedicated thereto) is not excluded.

In one or more embodiments, the indication of the execution mode of each quantitative test workload may comprise a performance pattern. However, the performance pattern may be defined in any way (for example, by maximum allowable delays) and at any level (for example, only globally for the whole quantitative test workload, only individually for all or some of its work units, in any combination thereof).

In one or more embodiments, the determining a test result of an execution of each test workload may comprise (for each quantitative test workload) determining the test result of the execution of the quantitative test workload according to a comparison between execution performance of the quantitative test workload and the performance pattern. However, the execution performance may be of any type (for example, average transactions per unit of time) and it may be compared with the performance pattern in any way (for example, by tolerating execution performance within pre-defined ranges of the corresponding performance pattern in some cases).

In one or more embodiments, the determining a test result of an execution of each test workload may comprise the following operation for each quantitative test workload with the performance pattern being defined individually for each work unit thereof: the test result of the execution of the quantitative test workload is determined according to a comparison between the execution performance of each work unit of the quantitative test workload and the performance pattern. However, the performance pattern may be defined in any way (see above) for any number of work units; moreover, the execution performance of each work unit may be of any type (see above) and it may be compared with the performance pattern in any way (for example, by tolerating specific work units or a predefined number/percentage thereof that do not meet the corresponding performance pattern).

In one or more embodiments, the executing each work unit of each test workload may comprise the following operation for each quantitative test workload with the performance pattern being defined globally for the quantitative test workload: the execution of the work units of the quantitative test workload is started in response to the reservation of the shared computing resources of the staging computing machines mapping all the production computing machines of the quantitative test workload. However, the execution of the work units may be started at any time (for example, as soon as the shared computing resources of the staging computing machines for a predefined percentage of first work units of the quantitative test workload have been reserved).

In one or more embodiments, the definition of the workloads of each user may be stored in a workload memory structure of the user in the production environment; said step of providing a definition of one or more workloads comprises extracting the definition of each test workload from the workload memory structure for performing said mapping of each production computing machine. However, the definition of the workloads may be provided in any way (for example, in a dedicated file for each user) and it may be retrieved in any way (for example, with the scheduler that passes is to the transposer).

In one or more embodiments, the mapping each production computing machine may comprise searching at least one eligible staging computing machine (of the staging computing machines), which is adapted to mirror the production computing machine according to a comparison between one or more characteristics of the production computing machine and corresponding computing resources of each staging computing machine. However, the eligible staging computing machines may be determined in any number (for example, by simply stopping their search as soon as one has been found) according to any comparison (for example, based on threshold values) of any measurable and/or unmeasurable computing resources (for example, mass memory size, available network connections).

In one or more embodiments, the mapping each production computing machine may comprise deploying a new staging computing machine (which is configured with computing resources corresponding to the characteristics of the production computing machine) in response to a negative result of the searching. However, the new staging computing machine may be configured in any way according to the characteristics of the production computing machine (for example, simply with the same computing resources) or even independently thereof (for example, with pre-defined computing resources for most practical situations); moreover, any other action may be performed when no eligible staging computing machine has been found (for example, simply waiting for it to become available when the staging computing machines are provided statically).

In one or more embodiments, the mapping each production computing machine may comprise mapping the production computing machine on one of the at least one eligible staging computing machine in response to a positive result of the searching or on the new staging computing machine otherwise. However, the production machine may be mapped on any eligible staging computing machine (for example, simply on the first one that has been found).

In one or more embodiments, the mapping each production computing machine may comprise adding an alias for the production computing machine to the corresponding staging computing machine. However, the mapping may be implemented in different ways (for example, by means of a naming conversion service).

In one or more embodiments, the mapping each production computing machine may comprise determining each prerequisite computing resource of the production computing machine required for executing the corresponding work unit. However, the prerequisite computing resources may be in number and of any type (for example, network connections) and they may be determined in any way (for example, by passing them by the scheduler to the transposer).

In one or more embodiments, the mapping each production computing machine may comprise configuring the corresponding staging computing machine according to each prerequisite computing resource of the production computing machine. However, the staging computing machine may be configured in any way according to the production computing machine (for example, by simply cloning it in a basic implementation).

In one or more embodiments, the mapping each production computing machine may comprise determining each remote service that is invoked by the corresponding work unit. However, the remote services may be of any type (for example, an FTP service within the data center of the corresponding tenant) and they may be determined in any way (for example, by retrieving them from the corresponding workload descriptor).

In one or more embodiments, the mapping each production computing machine may comprise simulating each remote service by a stub service available on the corresponding staging computing machine. However, the remote services may be simulated in any way (for example, by wrapping them with corresponding web services).

In one or more embodiments, the executing each work unit may comprise writing data of the corresponding user into a staging memory structure of the user in the staging environment, and reading the data of the user from the staging memory structure of the user when available or from a production memory structure of the user in the production environment otherwise. However, the data may be stored in any number and type of memory structures (for example, files) and its reading/writing may be managed in any other way (down to simply replicating the data in the staging environment).

In one or more embodiments, the method further may comprise promoting each test workload to execution in the production mode according to the corresponding test result. However, the promotion of each test workload may be conditioned in any way (for example, always requiring a manual intervention or always automatic with or without any notification); in any case, the test results may be used for additional, different or alternative purposes (for example, only for reporting).

In one or more embodiments, the users may be tenants of a software program supplied as a service in a cloud computing environment. However, the software program may be of any type (see below), even not of the multi-tenant type with a dedicated instance thereof for each user, and it may be supplied in any cloud computing environment (for example, private or hybrid); in any case, the possibility of applying the same technique to any other computing system (for example, implemented in a classic client-server environment) is not excluded.

In one or more embodiments, the software program may be a workload scheduler. However, the workload scheduler may be of any type or more generally it may be replaced with any other software program (for example, whatever workload manager, even not involving the creation of any plan, such as for managing network communications).

Generally, similar considerations apply if the same solution is implemented with an equivalent method (by using similar steps with the same functions of more steps or portions thereof, removing some steps being non-essential, or adding further optional steps); moreover, the steps may be performed in a different order, concurrently or in an interleaved way (at least in part).

In one or more aspects, a computer program is provided configured for causing a computing system to perform the above-mentioned method when the computer program is executed on the computing system. One or more embodiments provide a computer program product for testing execution of workloads in a computing system, the computer program product comprising a computer readable storage medium having program instructions embodied therewith, the program instructions executable by the computing system to cause it to perform the same method. However, the computer program may be implemented as a stand-alone module, as a plug-in for a pre-existing software program (for example, a scheduler), or even directly in the latter.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

One or more embodiments may comprise a system comprising means configured for performing the steps of the above-mentioned method. In particular, may include a system comprising a workload manager for providing a definition of one or more workloads for each one of a plurality of users of a computing system (the definition of each workload comprising an indication of one or more work units to be executed, an indication of a production computing machine of a production environment of the corresponding user for executing each work unit and an indication of an execution mode of the workload setting the workload as a production workload to be executed in a production mode or as a test workload to be executed in a test mode), a transposing module for mapping each production computing machine of each test workload on a staging computing machine (of one or more shared staging computing machines of a staging environment common to all the users) mirroring the production computing machine, a queue manager for executing each work unit of each test workload on the corresponding staging computing machine, with the transposing module further adapted to determine a test result of an execution of each test workload according to an execution result of one or more executions of the work units of the test workload. However, the method may also be carried out on a system based on a different architecture (for example, a local, wide area, global, cellular or satellite network), and exploiting any type of (wired and/or wireless) connections. However, its implementation on a stand-alone computer (with multiple terminals for its users) is not excluded.

Generally, similar considerations apply if the system has a different structure or comprises equivalent components or it has other operative characteristics. In any case, every component thereof may be separated into more elements, or two or more components may be combined together into a single element; moreover, each component may be replicated to support the execution of the corresponding operations in parallel. Moreover, unless specified otherwise, any interaction between different components generally does not need to be continuous, and it may be either direct or indirect through one or more intermediaries.

What is claimed is:

1. A method for servicing workloads, the method comprising:
providing a computing environment for servicing the workloads, the computing environment including a production computing environment and a common staging computing environment, the common staging computing environment comprising multiple staging computing machines shared by a plurality of users of the computing environment;
providing a definition of one or more workloads for each one of the plurality of users of the computing environment, the definition of each workload comprising a plurality of indications, the plurality of indications comprising an indication of one or more work units to be executed, an indication of the production computing machine of a production computing environment of the corresponding user for executing each work unit, and an indication of an execution mode of the workload setting the workload as a production workload to be executed in a production mode or as a test workload to be executed in a test mode;

identifying from the plurality of indications of the definition of a workload, the production computing machine for executing each work unit of the workload, and based on the plurality of indications of the definition of the workload indicating that the workload is to be executed as a test workload in the test mode, processing each work unit of the test workload by:

automatically mapping, by a transposer of the computing environment, the production computing machine of the work unit of the test workload to a staging computing machine of the multiple staging computing machines shared by the plurality of users, the mapping considering one or more computing resource characteristics of the production computing machine, and the transposer controlling the multiple staging computing machines shared by the plurality of users, the executing including the mapped staging computing machine accessing in read-only mode a production database used by the production computing machine of the production computing environment when the workload is set as the production workload;

executing the work unit of the test workload on the mapped staging computing machine of the multiple staging computing machines shared by the plurality of users; and determining a test result of the executing of the test workload, and based thereon, verifying whether the executing of the test workload behaves correctly on the mapped staging computing machine of the multiple staging computing machines shared by the plurality of users; and based on the test workload behaving correctly on the mapped staging computing machine of the multiple staging computing machines shared by the plurality of users, resetting, by a scheduler of the computing environment, the indication of the execution mode of the workload to the production workload, and executing the workload as the production workload in the production mode on the production computing machine of the production computing environment, wherein the test workload behaving correctly means execution of the test workload is successful for a predetermined number of consecutive times.

2. The method of claim 1, further comprising:

submitting the test workload for execution to a transposing module common to the users, the transposing module performing the mapping of the production computing machine and submitting each work unit of the test workload for execution to the staging computing machine.

3. The method of claim 1, wherein the executing each work unit comprises:

submitting the work unit for execution to a queue manager of the staging computing machine common to the users, and dispatching the submission of the work unit by the queue manager to an available staging agent of one or more staging agents of the staging computing machine for causing the staging agent to execute the work unit.

4. The method of claim 3, wherein the dispatching the submission of each work unit comprises, for each dependent work unit of the work units of the test workload depending on one or more predecessor work units of the work units of the test workload:

dispatching the submission of the dependent work unit by the queue manager in response to an indication of completion of the execution of all the predecessor work units from the queue managers of the corresponding staging computing machines.

5. The method of claim 1, wherein the indication of the execution mode of the test workload sets the test workload as a qualitative test workload to be executed in a qualitative test mode or as a quantitative test workload to be executed in a quantitative test mode, the executing each work unit of the test workload comprising, for the quantitative test workload:

reserving one or more shared computing resources of the staging computing machine as part of the mapping the production computing machine.

6. The method of claim 5, wherein the indication of the execution mode of the quantitative test workload comprises a performance pattern, the determining a test result of an execution of the test workload comprising, for each quantitative test workload:

determining the test result of the execution of the quantitative test workload according to a comparison between execution performance of the quantitative test workload and the performance pattern.

7. The method of claim 6, wherein the determining the test result of execution of the test workload comprises, for the quantitative test workload with the performance pattern being defined individually for each work unit thereof:

determining the test result of the execution of the quantitative test workload according to a comparison between the execution performance of each work unit of the quantitative test workload and the performance pattern.

8. The method of claim 6, wherein the executing each work unit of the test workload comprises, for the quantitative test workload with the performance pattern being defined globally for the quantitative test workload:

starting the execution of the work units of the quantitative test workload in response to the reservation of the shared computing resources of the staging computing machines mapping the production computing machine of the quantitative test workload.

9. The method of claim 1, wherein the definition of the workloads of each user is stored in a workload memory structure of the user in the production computing environment, the providing the definition of one or more workloads comprising extracting the definition of each test workload from the workload memory structure for performing the mapping of each production computing machine.

10. The method of claim 1, wherein the mapping the production computing machine comprises:

searching at least one eligible staging computing machine of the staging computing machines being adapted to map the production computing machine according to a comparison between the one or more computing resource characteristics of the production computing machine and corresponding one or more computing resource characteristics of each staging computing machine;

deploying a new staging computing machine, configured with the one or more computing resource characteristics corresponding to the characteristics of the production computing machine, in response to a negative result of the searching; and mapping the production computing machine on one of the at least one eligible staging computing machine in response to a positive result of the searching, or on the new staging computing machine otherwise.

11. The method of claim 1, wherein the mapping the production computing machine comprises:

adding an alias for the production computing machine to the staging computing machine.

12. The method of claim 1, wherein the mapping the production computing machine comprises:

determining each prerequisite computing resource of the production computing machine required for executing the corresponding work unit; and configuring the staging computing machine according to each prerequisite computing resource of the production computing machine.

13. The method of claim 1, wherein the mapping the production computing machine comprises:

determining each remote service being invoked by the corresponding work unit, and simulating each remote service by a stub service available on the staging computing machine.

14. The method of claim 1, wherein the executing each work unit comprises:

writing data of the user into a staging memory structure of the user in the staging computing environment; and reading the data of the user from the staging memory structure of the user when available, or from a production memory structure of the user in the production computing environment otherwise.

15. The method of claim 1, wherein the method further comprises:

promoting the test workload to execution in the production mode according to the corresponding test result.

16. The method of claim 1, wherein the users are tenants of a software program supplied as a service in a cloud computing environment.

17. The method of claim 16, wherein the software program is a workload scheduler.

18. A computer program product for servicing workloads in a computing environment, the computer program product comprising:

a computer readable storage medium having computer readable program instructions embodied therewith, the computer readable program instructions being executable by the computing system to cause the computing system to:

provide a definition of one or more workloads for each one of a plurality of users of the computing environment, the definition of each workload comprising a plurality of indications, the plurality of indications comprising an indication of one or more work units to be executed, an indication of a production computing machine of the computing system in a production computing environment of the corresponding user for executing each work unit, and an indication of an execution mode of the workload setting the workload as a production workload to be executed in a production mode or as a test workload to be executed in a test mode;

identify from the plurality of indications of the definition of a workload, the production computing machine for executing each work unit of the workload, and based on the plurality of indications of the definition of the workload indicating that the workload is to be executed as a test workload in the test mode, process each work unit of the test workload by:

automatically mapping, by a transposer of the computing environment, the production computing machine of the work unit of the test workload to a staging computing machine of multiple staging computing machines shared by the plurality of users, the mapping considering one or more computing resource characteristics of the production computing machine, and the transposer controlling the multiple staging computing machines shared by the plurality of users, the executing including the mapped staging computing machine accessing in read-only mode a production database used by the production computing machine of the production computing environment when the workload is set as the production workload;

executing the work unit of the test workload on the mapped staging computing machine of the multiple staging computing machines shared by the plurality of users; and determine a test result of the executing of the test workload, and based thereon, verifying whether the executing of the test workload behaves correctly on the mapped staging computing machine of the multiple staging computing machines shared by the plurality of users; and based on the test workload behaving correctly on the mapped staging computing machine of the multiple staging computing machines shared by the plurality of users, resetting, by a scheduler of the computing environment, the indication of the execution mode of the workload to the production workload, and executing the workload as the production workload in the production mode on the production computing machine of the production computing environment, wherein the test workload behaving correctly means execution of the test workload is successful for a predetermined number of consecutive times.

19. The computer program product of claim 18, wherein the computer readable instructions executable by the computing system further cause the computing system to:

submit the test workload for execution to a transposing module common to the users, the transposing module performing mapping of the production computing machine and submitting each work unit of the test workload for execution to the staging computing machine.

20. A system for servicing workloads in a computing environment, the system comprising:

a memory; and a processing device communicatively coupled to the memory, wherein the system performs a method comprising:

providing a definition of one or more workloads for each one of a plurality of users of the computing environment, the definition of each workload comprising a plurality of indications, the plurality of indications comprising an indication of one or more work units to be executed, an indication of a production computing machine of a production computing environment of the corresponding user for executing each work unit, and an indication of an execution mode of the workload setting the workload as a production workload to be executed in a production mode or as a test workload to be executed in a test mode;

identifying from the plurality of indications of the definition of a workload, the production computing machine for executing each work unit of the workload, and based on the plurality of indications of the definition of the workload indicating that the workload is to be executed as a test workload in the test mode, processing each work unit of the test workload by:

automatically mapping, by a transposer of the computing environment, the production computing machine of the work unit of the test workload to a staging computing machine of multiple staging computing machines shared by the plurality of users, the mapping considering one or more computing resource characteristics of the production computing machine, and the transposer controlling the multiple staging computing machines shared by the plurality of users, the executing including the mapped staging computing machine accessing in read-only mode a production database used by the production computing machine of the production computing environment when the workload is set as the production workload;

executing the work unit of the test workload on the mapped staging computing machine of the multiple staging computing machines shared by the plurality of users; and determining a test result of the executing of the test workload, and based thereon, verifying whether the executing of the test workload behaves correctly on the mapped staging computing machine of the multiple staging computing machines shared by the plurality of users; and based on the test workload behaving correctly on the mapped staging computing machine of the multiple staging computing machines shared by the plurality of users, resetting, by a scheduler of the computing environment, the indication of the execution mode of the workload to the production workload, and executing the workload as the production workload in the production mode on the production computing machine of the production computing environment, wherein the test workload behaving correctly means execution of the test workload is successful for a predetermined number of consecutive times.

* * * * *